United States Patent [19]

Poetsch

[11] 4,288,818
[45] Sep. 8, 1981

[54] METHOD AND SYSTEM TO SCAN MOTION PICTURE FILM TO DEVELOP TELEVISION SIGNALS

[75] Inventor: Dieter Poetsch, Darmstadt, Fed. Rep. of Germany

[73] Assignee: Robert Bosch GmbH, Stuttgart, Fed. Rep. of Germany

[21] Appl. No.: 928,783

[22] Filed: Jul. 28, 1978

[30] Foreign Application Priority Data

Aug. 8, 1977 [DE] Fed. Rep. of Germany ....... 2735685

[51] Int. Cl.³ .............................................. H04N 3/36
[52] U.S. Cl. .................................................. 358/214
[58] Field of Search ............................. 358/214–216, 358/54, 11, 102, 107, 140, 130, 131, 132; 360/10

[56] References Cited

U.S. PATENT DOCUMENTS

| Re. 29,807 | 10/1978 | Metzger | 358/54 |
|---|---|---|---|
| 2,774,815 | 12/1956 | Gillette | 358/215 |
| 2,922,841 | 1/1960 | Graziano | 358/216 |
| 2,947,810 | 8/1960 | Horsley | 358/216 |
| 3,806,645 | 4/1974 | Favreau | 358/214 |
| 3,882,539 | 5/1975 | Faroudja | 358/140 |
| 3,952,328 | 4/1976 | Biber | 358/214 |
| 4,057,836 | 11/1977 | Munsey | 358/134 |
| 4,059,842 | 11/1977 | Meacham | 358/150 |
| 4,149,191 | 4/1979 | Longchamp | 358/214 |
| 4,205,337 | 5/1980 | Millward | 358/214 |

FOREIGN PATENT DOCUMENTS

2632378 1/1978 Fed. Rep. of Germany ...... 358/216

Primary Examiner—John C. Martin
Attorney, Agent, or Firm—Frishauf, Holtz, Goodman & Woodward

[57] ABSTRACT

To derive TV signals in standard TV interlace scanning format upon continuous scanning of motion picture film, line by line, the scanned signals are stored in a memory and the lines of the film frame, as they are being scanned, are assigned individual line addresses which permits read-out, in accordance with standard TV signal standards, from the individual addresses. In a preferred form, alternate lines, as they are being scanned, have their addresses incremented by a number corresponding to half the scanning lines (262 for the NTSC system), so that alternate sequentially scanned lines will be stored in the memory as addresses corresponding to interlaced reproduction. The address generation is synchronized with movement of the film and the generation of address signals can be either direct or modified to permit reproduction in slow-motion or accelerated motion; the scanning can be direct or modified to compensate for distortion of film exposed through anamorphic lenses to reconstitute signals stored for undistorted presentation although these signals may cover only portions of possible addresses. The memory is read with a half-scanning frame delay so that a complete film frame is stored before the first half-frame is read out.

25 Claims, 6 Drawing Figures

METHOD AND SYSTEM TO SCAN MOTION PICTURE FILM TO DEVELOP TELEVISION SIGNALS

The present invention relates to the conversion of images on motion picture film to television image signals, and more particularly to a method and system for optically scanning motion picture film and then deriving television (TV) signals in which the film is continuously scanned without skips for interlacing.

Various types of systems and method to scan motion picture film to develop TV image signals have been proposed. In some of those systems, the films are continuously moved. The TV signals which are derived, and which must conform to standards set by governmental regulatory authorities, include line and frame flyback signals. It is customary to scan each image twice, once with odd-numbered lines, and the second time with even-numbered lines, and to interlace the lines as they are being reproduced. Accordingly, TV frame scanning systems have been proposed in which the scanning beam is split into two components so that, in spite of continuous movement of the motion picture film, double scanning can be obtained, that is, scanning by two lines. Another type of motion picture film scanning system has been suggested in which a movable mirror is provided which, for each half image, has one of two alternate positions. Due to the different treatment of the half images or half frames—be it by separate beams or differently positioned mirror surfaces—some disturbances are noticeable at times which appear in the form of flicker.

Film scanning devices have been proposed to avoid the flicker problem in which the film frames are scanned, line for line, without skipping any lines, recording the signals and reading the thus recorded signals in accordance with TV transmission standards.

The Invention

It is an object to improve the scanning of motion picture films to derive TV signals, to simplify the apparatus, and, particularly, to avoid the necessity of complex optical systems; and to arrive at a system and method which is versatile, so that films of various formats can be scanned, and the resulting image matched to the film, and in which films can be scanned and reproduced at a different reproduction rate to give the effect of speeded-up or slow-motion film.

Briefly, the film is moved continuously. The frame is scanned, line by line, and scanned signals are derived. The scanning rate is high and predetermined; it is independent of film motion speed. The derived signals are stored in a memory. The lines of the film frame, as they are being scanned, are assigned individual line addresses, and the signals are stored in the memory at predetermined address locations. The data in the memory are then read out in accordance with TV scanning standards. Preferably, the line addresses for the signals to be stored in the memory are determined as a function of the film position with respect to the scanning beam derived, for example, from the film transport mechanism which is coupled to a signal transducer so that film movement and storage in respective addresses are synchronized. Film frame position can be determined, for example, by deriving a signal synchronized with an edge of the sprocket holes in the film.

In accordance with a preferred feature of the invention, the film images are read out with a one-half frame phase shift or read-out time shift, so that the read-out from the memory is one-half frame behind recording.

In accordance with a feature of the invention, the duration of scanning of any line is held fixed or constant, while the line sequence frequency upon scanning is matched to the respective film format so that, for example, Cinemascope films can be suitably reproduced.

The film transport, in accordance with an advantageous feature of the invention, is so controlled that one film frame is completely scanned before the read-out of the first half-image from the storage or memory has been terminated. As a result, one complete TV image is placed in the memory; this prevents formation of a TV frame which is a composite of two sequential scenes if the subject matter on the film changes dramatically between succeeding frames.

Various types of sensors can be used in the system for scanning, preferably linear optical sensors.

Drawings, illustrating a preferred example and timing diagrams.

Figure 1:
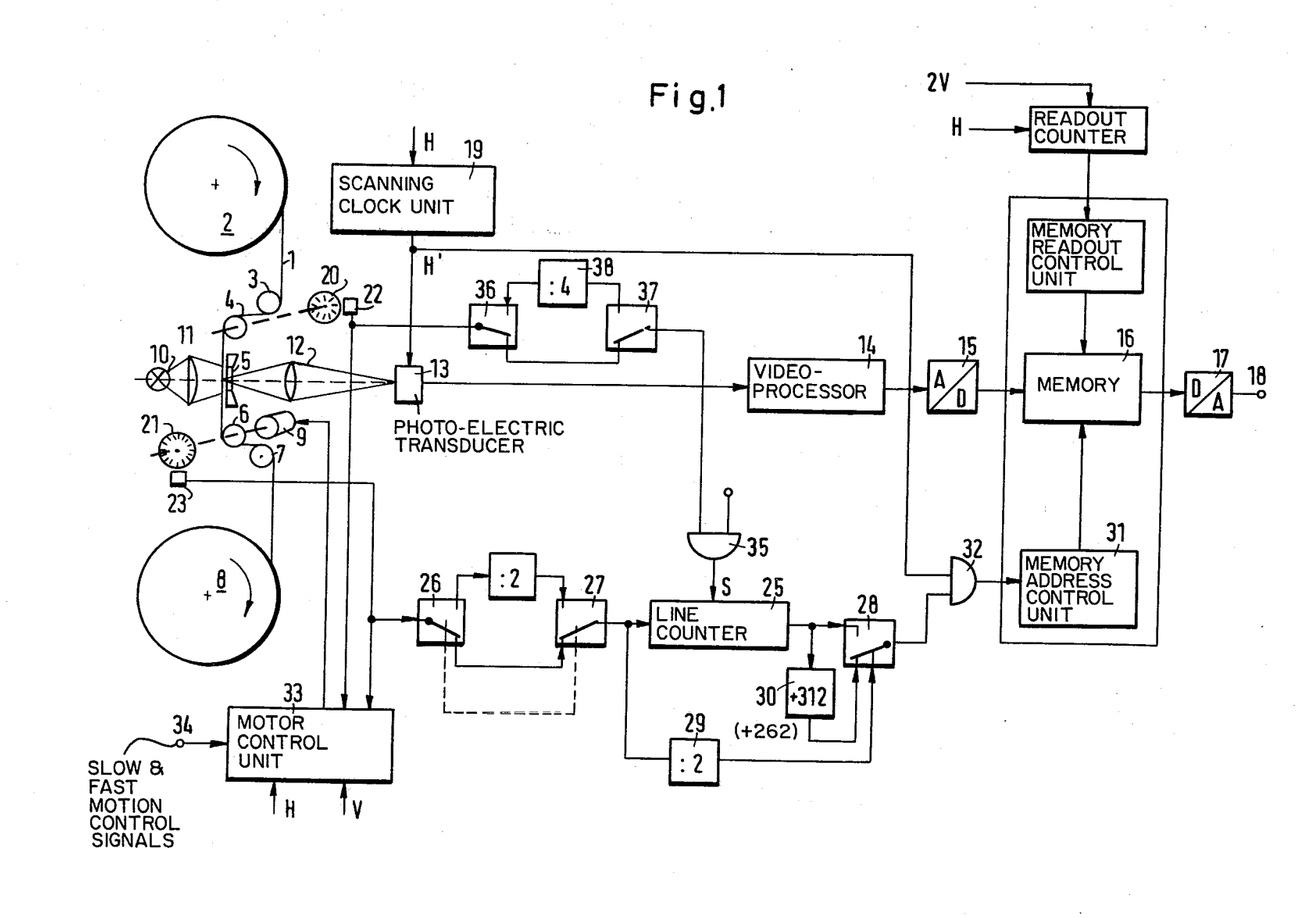
FIG. 1 is a schematic block diagram of the system.
Figure 2:
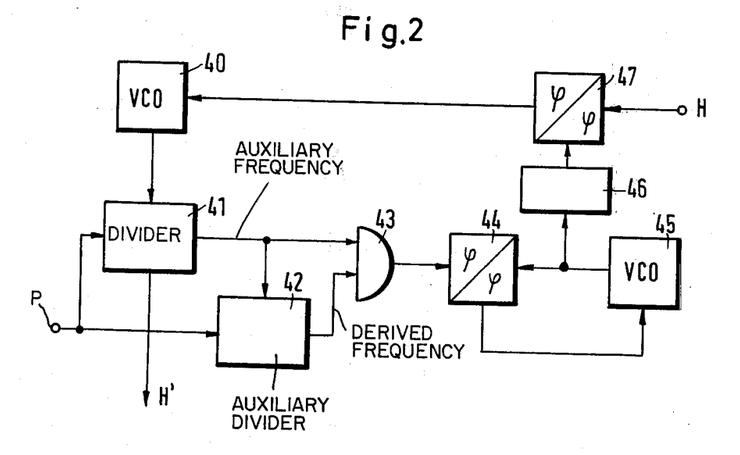
FIG. 2 is a schematic block diagram of a circuit to derive the line sequence frequency used in scanning.

The constructions of the individual elements illustrated in FIGS. 1 and 2 are well known in the art of motion picture-TV image signal conversion, and only so much of the system is illustrated as is necessary for an understanding of the invention.

The film 1 (FIG. 1) to be scanned is delivered from a supply spool 2, guided over guide roller 3, a sprocket roller 4, the film window 5, a capstan 6, a further guide roller 7, and then wound up on a take-up reel 8. The film speed is determined by the rotary speed of capstan 6. Capstan 6 is driven by a capstan motor 9. The various apparatus necessary to drive take-up reel 8, pay-out reel 2, and the like, have not been shown; control of the speed of reels 2 and 8 and their drive can be done in accordance with any well-known system corresponding to the pull-down speed determined by the capstan 6 pulling the film in front of window 5.

A projection lamp 10 associated with an optical system 11, of which only a single condenser lens is shown for simplicity, illuminates the film in window 5. The light output is passed through an optical system 12, of which only an objective is shown, which focusses the film on an optical sensor or transducer 13. Photo transducer 13 can be any well-known scanning apparatus. The present invention is independent of whether the film is a black-and-white (B/W) film, or color film;

likewise, the invention is indepent of whether the transmission is to be for B/W TV reception or color reception. In case of color reception, three transducers similar to transducer 13 are preferably used on which the light is projected in accordance with a well-known color splitting arrangement. The output signals of the photoelectric transducer 13, or of the group of transducers 13, are amplified, corrected in accordance with well-known correction factors in correction networks as known in TV technology in a video processor 14 and then transformed into digital signals in the analog-digital (A/D) converter 15. Transposing the images into digital signals has the advantage of greatly simplified storage, since digital signals can be readily stored without loss in quality. The output of A/D converter 15 is connected to a memory 16. Memory 16 has a capacity sufficient to store the contents of an entire TV frame, including color information, if necessary. The digital TV signals are read out from memory 16 in accordance with TV reproduction standards—as will appear—then converted in a D/A converter 17 into analog signals and are available as standard video signals at terminal 18 of FIG. 1.

The line-by-line scanning of the film frames, that is, the control of the photo transducer 13 (or transducers 13, if color signals are desired) is controlled by a scanning clock source 19, which will be described in connection with FIG. 2.

The address which corresponds to the position of the respective line within an image frame of the film is derived by obtaining pulses from the sprocket 4 which are associated with the upper or lower edge of any one of the film frames; and by deriving pulses upon rotation of capstan 6 which are used to step a counter. The sprocket 4 is connected to a counter disk 20; the capstan 6 is connected to a counter disk 21. Disk 20, 21 are formed with circumferential markers which subdivide the disk into angular regions which can be sensed or scanned by a respective transducer 22, 23 associated with the respective disk 20,21. For example, transducer 22 will generate a pulse as soon as the film moves from one perforation to the next. These pulses from the transducers 22, 23 are connected to input terminals of a line counter 25, as will be described.

The address in the memory 16 is determined by a control unit 31 which, in turn, is controlled by the line counter 25. Thus, since the line counter 25 is controlled from the position of the film by the transducer 22 and the rotation of the capstan 6 by the transducer 23, the address of the respective signals to be stored in the memory 16 is directly derived from the respective position of the film within the film window 5. Counter pulses are derived from counter 25 which is set based on film perforations, that is, by the transducer 22 coupled to disk 20 and to sprocket 4; the count pulses themselves are derived from transducer 23 which counts as the film moves past window 5 under control of movement of capstan 6. The transducer 22 is preferably so arranged with respect to disk 20 and the sprocket 4 that either the leading edge or the trailing edge of the perforations causes a respective control signal to be applied to the line counter 25. The first one of the lines scanned for any frame of the film is placed preferably into a predetermined initial address, the position may depend on the film format. Film frame indicia can also be scanned optically to obtain address coding pulses.

The number of pulses which transducer 23 coupled to disk 21 and hence to capstan 6 will provide depends on the number of lines of the TV standard employed: for the PAL standard, this would be 625 lines; for the NTSC standard, 525 lines. These are the numbers of lines during which the film is moved by one film or image frame. In normal operation, switches 26, 27 are in their lower position, as shown in FIG. 1, so that the pulses are directly applied to the counter 25 until a next frame break pulse is sensed. The counter state which obtains during the scanning of a line forms the address of the respective line. To so arrange the memory address in memory 16 that read-out can be obtained with interlace, that is alternately line skipped signals systems under continuous read-out conditions, the address is incremented for each second line by the number 311 for the PAL (625 line) system, or by the number 262 for the NTSC system. An electronic transfer switch 28 controls change-over of the address by respectively adding the fixed number of 312, or 262, respectively—depending on system—for alternate lines. This number is stored in a fixed number memory 30, the switch 28 being controlled to alternate operation by a divide-by-two counter 29. Other systems can be used to associate the respective addresses in the memory 16 with proper sequential read-out, although the lines themselves are not to be reproduced in the order that the line control signals are derived. For example, a different arrangement can be had with respect to memory 16 which may include reading the signals of the scanned lines sequentially in the memory and controlling the read-out by skipping alternate line addresses and then returning to then read out the previously skipped lines. The address of recording is controlled by a memory address control unit 31. Unit 31 receives a fixed address over an AND-gate 32 when a certain line, as determined by the scanning clock unit 19, is to be started.

Capstan motor 9 is controlled by a motor control unit 33. Motor control unit 33 receives film frame separating pulses and line count pulses from the transducers 22, 23 respectively, and additionally horizontal and video synchronizing pulses. The motor control unit 33 additionally has a control voltage 34 applied thereto. Motor control unit 33 so controls the speed of the capstan motor 9 that, upon reproduction at standard speed, the film is moved synchronously with the TV clock or synchronization signals. Such circuits are well known with respect to film scanning systems as well as with respect to video tape recording apparatus, and any suitable one of these systems may be used. A specific case, and a specific modification will be explained in connection with FIG. 3. It is possible to operate motor 9 at a speed other than the standard speed in order to obtain slow motion or speeded-up motion of the images on the film. The control voltage 34 supplies such additional control signals.

No image information is transmitted during the vertical retrace of the TV signal. Thus, the image content is distributed not entirely over 625 (PAL system) lines, but somewhat less, for example to about 590 lines under that system, which would correspond to about 500 lines under the NTSC system. Consequently, and since the film moves continuously, roughly the same percentage of the film is not transmitted. Since standard motion picture film has a frame bar, that is, a space or break line between sequential frames of the film which, however, normally does not correspond to the portion of the vertical retrace, line frequency upon scanning must be changed in dependence on the width of the frame bar, or separating break line. For example, if upon scanning in accordance with the European PAL system, the width of the film separating break line is more than 8% of the overall height of a frame, scanning with somewhat greater frequency is necessary. These differences are relatively small in 16 mm as well as in 35 mm film. It is sufficient if the repetition frequency is changed, whereas the time during which a line is scanned is held constant. Upon only slight increase of the line repetition frequency, only the horizontal scanning frequency becomes smaller whereas the active line repetition rate remains.

FIG. 2 illustrates a circuit which can be used to obtain the scanning repetition frequency which is different from the line frequency of the TV system. The circuit of FIG. 2 is used in accordance with the circuit of FIG. 1 and corresponds to element 19 of FIG. 1. Basically, a controlled oscillator operating at a frequency of several megahertz is used to obtain a divided frequency by means of a divider. A voltage controlled oscillator 40 is preferred, and connected to a divider 41. The divider 20 generates an auxiliary frequency. The division ratio of the divider can be programmed in accordance with film format. An auxiliary divider 42 is connected to the divider 41 which again divides the auxiliary frequency to obtain a derived frequency. The derived frequency and the auxiliary frequency are both connected to the inputs of an AND-gate 43. Upon suitable arrangement of the division ratio of divider 42, the output of AND-gate 43 will have pulses appear thereat which have a repetition rate different from the auxiliary frequency. The pulses are compared in a phase comparator 44 with the output of a second voltage controlled oscillator 45. The frequency of the second voltage controlled oscillator (VCO) 45 thus will be the average value of the frequency of the pulses from AND-gate 43. A further divider 46 then derives a further signal, the frequency of which is phase-compared in a phase comparator 47 with pulses at horizontal frequency and connected as a control signal to the VCO 40. The phase comparator 47 operates at the horizontal frequency. Consequently, oscillator 40 is controlled to oscillate at a frequency which is a multiple of the horizontal frequency and which differs in predetermined manner from the horizontal frequency. Pulses can thus be obtained from the first divider 41 which have a predetermined relationship to the horizontal frequency. The particular relationship itself is determined by a program connected to a control terminal P, as will appear. The output from divider 41 is a signal H', that is, a signal which differs from the horizontal frequency, and applied to transducer 13 as well as to AND-gate 32 as shown in FIG. 1.

TV scanning of motion picture film must be versatile and also suitable to scan film which does not have the normal vertical-to-horizontal relationship of approximately 3:4. It must also be available to scan films in which the recording is optically artificially distorted, to be then compensated upon projection by a similar re-distortion, compensation optical system. Cinemascope films are a typical example. The present invention is suitable to scan Cinemascope films which, for a complete understanding, will be described briefly.

The proportional relationship of the length of the base and the height of standard film formats, that is, 16 mm and 35 mm standard film, is approximately that of a TV screen; this format has a ratio of about 3:4. In Cinemascope film, however, the relationship between width of the projected image and height is about twice as great. Cinemascope film, however, uses the standard 35 mm film. Upon exposure or recording, an anamorphic objective is used which compresses the width of the scene with respect to the height by about half. Upon projection of such films, this distortion is compensated by a projection objective associated with the projector which includes anamorphic optics. Such an anamorphic objective or optical arrangement can be saved when a Cinesmascope film is to be represented in television images by suitable adjustment of the deflection amplitudes of the TV scanning system. The reproduction on the TV screen should be without distortion; yet, the format of the TV tube cannot be changed and will retain its relationship of height to width of about 3:4. This means that the film can be scanned in such a manner that either the width is completely retained and the Cinesmascope image will have only half of the height of the tube; or, alternatively, the height can be properly reproduced and strips of the scene to be shown at the left and at the right are cut away, that is, are not transmitted at all. In actual practice, it is customary to select a compromise by introducing dark strips at the upper and lower edge of the image which should be of a width so as not to be disturbing to the viewer, while suppressing at the right and left side only those portions of the image which may be considered of lesser importance.

The scanning arrangement permits a simple way of so reproducing Cinemascope film without using an anamorphic lens while scanning the full width of the image. This is achieved by so arranging the addresses in which the signals are stored upon scanning that, when the signals are read out from the memory, the image to be reproduced will be reduced by half with respect to the height of the TV screen. Switches 26, 27 (FIG. 1), when placed in their upper position, provide a division by two; consequently, the line counter will receive only every other count pulse and only every other line which is scanned receives a new address. The content of two lines is thus recorded in the same address in the memory. Consequently, the image content of the over-all frame is reduced to half the numbers of lines for reproduction of the scene on the TV screen. A gate 35 is provided connected to the SET input of the line counter so that, upon start of an image, the first line is recorded at that address in the memory which is associated with the first line of the TV image, as described in connection with the application of frame separating pulses and their use in the system of FIG. 1. The gate 35 will have an address applied thereto which depends on the format of the film which is being scanned. If Cinemascope film is to be scanned, the first image line can be recorded, for example, at the line 100 of the TV screen (for a 625-line system; for example at line 90 in the NTSC system); if the scanning is to be done from a normal 35 mm film, or 16 mm film, for example, the gate 35 will have a 0 or a 1 applied thereto.

Standard 16 mm film has one perforation for each frame. Pulses generated in the transducer 22, derived from the sprocket 4 and the transducer disk 20, can thus be used directly as the SET pulses for the counter 25. Switches 36, 37 will then be in their lower position, as shown in FIG. 1. 35 mm film has four perforations for each frame and thus a divide-by-four counter 38 is interposed between the output from transducer 22 and the SET S input to the counter 25. Switches 36, 37 thus permit versatility in use of the system and enable quick change-over from one film format to another. Changing switches to the upper position so that the divide-by-four counter 38 is effective introduces, however, an ambiguity since there is no unambiguous association between the pulses derived from the photoelectric transducer 22 and the frame separation between adjacent frames of the film. To provide for such unambiguous association, the address of the line counter 25 is movable in increments of a quarter of the height of a frame, under manual control, not shown, in order to synchronize the output from the transducer 22, divided by four, and the count start of the line counter 25. Moving the line counter 25 for synchronization of the output pulses from transducer 22 so that they will be positively associated with the edge of a frame may have to be repeated several times until the line counter count state and the edge of the film frame are coincident.

Figure 3A:
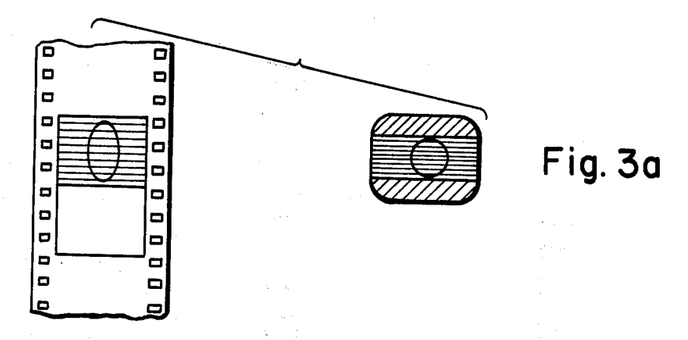
FIG. 3 is a graphic representation of the geometric relationships upon scanning of non-standard films, and illustrating in view (a) one type of geometric relationship upon scanning of Cinemascope film, and in view (b), another geometric relationship upon scanning of a Cinemascope film.
Figure 3B:
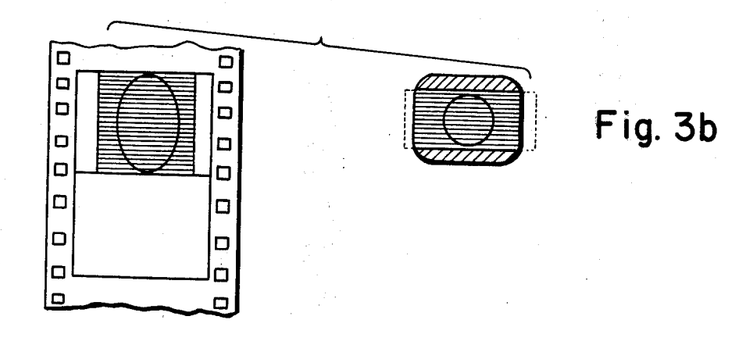

Scanning of Cinemascope film is schematically illustrated in FIG. 3. View (a) of FIG. 3 shows a circle recorded on a film strip in which the lateral sides are compressed. The film, shown at the left, is entirely scanned; the image content is compressed about half of the image height, however, as shown on the reproduction copy at the right of view (a), where the video image is illustrated in the horizontally lined portion. The inclined, cross-hatched portion will appear on the video reproduction as black strips at the top and bottom of the scene being reproduced.

The vertical resolution of the TV screen can be better utilized by so scanning Cinemascope films that the right and left portions of the screen contain only a part of the scene being reproduced, the remainder being suppressed or lost. Accordingly, the reproduction of the film scene is projected on the photoelectric transducer 13 to an enlarged scale. This can readily be achieved by changing the objective 12 (FIG. 1) or changing the zoom focal length thereof. As illustrated in view (b) of FIG. 3, the central portion of the film frame is scanned completely; the entire height of the frame is scanned. The black strips at the top and bottom of the TV image will be narrower than in the illustration of view (a), although the portions of the film frame which are indicated in broken lines in view (b) are not transmitted. This results in a somewhat enlarged and more pleasing overall reproduction; it requires, in addition to a change in the focal length of the optical system 12—by exchange of the lens, for example, or other arrangement—further a change of the line repetition frequency. This requires change of the scanning clock unit 19. The line repetition frequency will then be about 10 kHz—for the European PAL system.

If the films are operated at normal standard "take" speed, it is desirable and preferred to synchronize the film transport with the TV clock or frame repetition rate. It is desirable to maintain a certain phase difference between the film scanning and read-out of the stored or memorized TV signals from the memory 16 so that a complete TV frame image can be associated with only a single motion picture frame. Since, however, in TV reproduction first a half-image or half-frame is transmitted, and thereafter an interlaced second half-frame, whereas, upon scanning in accordance with the system, the film is scanned sequentially, line for line, it is preferred and desirable to so select the phase difference that the last line of any one film frame is stored in the memory before the last line of the first half-frame is read out from the memory 16 (FIG. 1). Thus, a phase difference of a half-frame will result. This relationship is graphically illustrated in FIG. 4.

Figure 4:
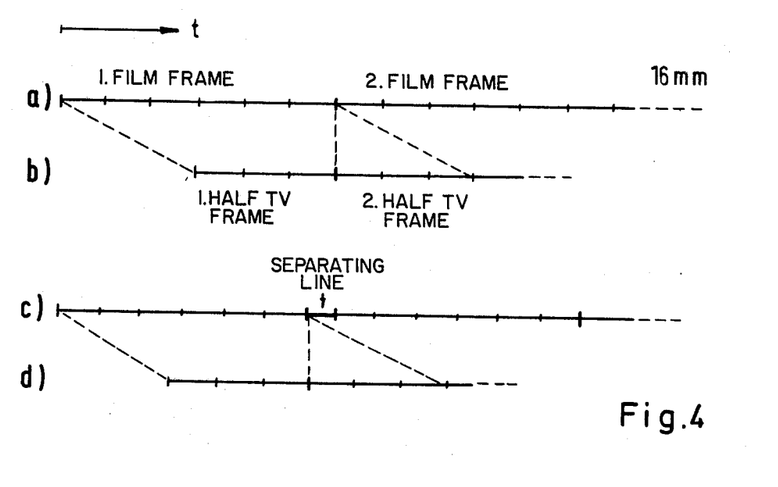
FIG. 4 is a graphic representation illustrating the temporal relationship between storage and read-out of film images and TV images.

FIG. 4 shows a timing diagram of storage and read-out. Graph (a) of FIG. 4 shows continuous scanning of a 16 mm film in which any subdivision represents about 100 lines. Graph (b) illustrates, similarly, the TV frame signals which are read out from the memory. The first half frame of the TV signal, which includes the content of the film frame, commences only when the first film frame has been scanned only about to half its extent, so that the first film frame will be completely scanned when the last odd line of the TV frame is ready for read-out. The second TV half-frame, interlaced with the first, will then be read out from the memory while the second film frame commences to be scanned for storage in the memory.

Graph (c) and graph (d) of FIG. 4 illustrate the same relationships for 35 mm film. Due to the greater difference of relationships including the width of the separating lines between frames, it is necessary to consider the width of the frame separating line as well.

Synchronization and interconnection of the film transport with the TV clock repetition rate is of importance, of course, only upon reproduction of films operating at normal speed. This synchronization is not absolutely necessary; the TV scene may then, however, be reproduced from two film frames, or portions of one and portions of another adjacent one. In normal film reproduction, this is not disturbing.

Figure 5:
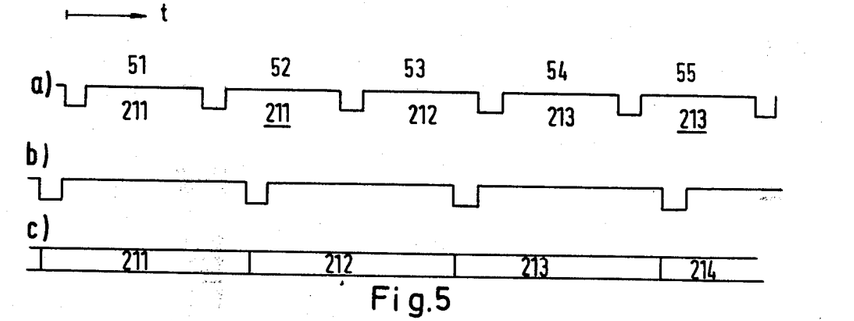
FIG. 5 is a series of graphs illustrating the time relationship between scanned lines and derivation of addresses if the film frame repetition frequency is below that of the TV image frequency.

It may be desirable to reproduce scenes stored on film at speed other than the taking speed. Upon reproduction of film below the normal film speed, the number of lines for each film frame being scanned will increase. Memory 16, however, stores only that number of lines which are associated with the specific TV scanning standard—for example 625 (PAL) or 525 (NTSC). This can readily be derived from the arrangement in accordance with FIG. 1 by transferring the address at the beginning of a line being scanned by means of the AND-gate 32 (FIG. 1) to the memory recording control unit 31. The temporal relationship is illustrated in FIG. 5, in which in line a, various signals are schematically represented by the scanning intervals of the horizontal frequency. They are numbered consecutively from 51 to 55. If this film is to be read out under slow-motion conditions, then the count pulses, which are illustrated in graph (b), derived from the transducer 23 will have a lower frequency. This explanations starts from the consideration that each count pulse steps the line counter 25 by one digit, that is by 1, with the leading flank thereof. For purposes of this discussion, the interlace relationships and Cinemascope-distortion will not be considered, so that the principle can be more easily understood. Graph (c) shows that an address in the line counter will maintain the same value until it gets the next count pulse, to be then incremented by 1. The address—as described above in connection with the AND-gate 32—is now associated with the respective line, the scanning of which just has started. Line 51, thus, receives the address 211. Line 52, since at the beginning thereof the address 211 is still valid, will also receive the same address. Thus, line 52 will be stored in the same storage positions of the memory 16 as line 51. As a consequence, the content within memory 16 of line 51 will be erased in the customarily used memories and replaced by the content of line 52. Line 53 receives address 212; line 54 receives the address 213, but line 55 will also receive the address 213 which, again, means that line 54 will not be available for read-out since it will have been erased by line 55, and therefore effectively is not being stored. Since, as a consequence, the image content of various lines is not used or evaluated, a vertical image distortion will result. This vertical image distortion is very slight, however, and changes from line to line and, as has been found in actual experience, is not disturbing to the viewer.

Figure 6:
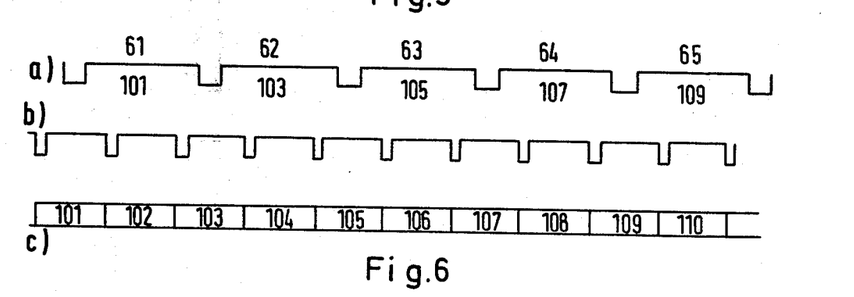
FIG. 6 is a diagram similar to FIG. 5, in which the film image frequency is above that of the TV image frequency, corresponding to slow-motion reproduction.

The converse relationship may obtain if, rather than slowmotion, a speeded-up or accelerated-motion reproduction is desired. FIG. 6 illustrates the relationship upon scanning of films with speeds which are above normal taking speed. The pulses derived from the transducer 23 (FIG. 1) will now have a repetition rate or frequency which is greater than the line repetition frequency, as clearly seen in FIG. 6, graph (b). Correspondingly, the time duration of the respectively valid address will be reduced, as seen in graph (c) of FIG. 6. The line 61, graph (a) of FIG. 6, receives the address 101, which is valid at the beginning of this line. Correspondingly, line 62 receives the address 103, line 63 the address 105, line 64 address 107, and line 65 address 109. The signals of these lines are then recorded in the respective memory positions. corresponding to the addresses of the lines as given. The memory positions corresponding to the line addresses 102, 104, 106, 1–8, 110 initially are free or unoccupied so that, upon reproduction, the read-out of those lines 102, 104, 106, 108, 110 will not result in video signals. To avoid this disadvantage, various possibilities present themselves: For example, when reading out the signals from the memory, the content of any one line can be read twice if a subsequent line has no video signal stored therein. This solution decreases the resolution, however. Another possibility is to supplement the missing or blank lines by so controlling the transport speed of the film that the subsequent film frame will fill the blank memory positions of the memory 16, that is, where nothing was stored in prior storage. This can readily be obtained by so arranging, respectively, the film transport speed with respect to normal scanning speed, that the film speed does not differ by a whole number multiple from normal film speed. In some, and undesirable situations, it may be necessary to use more than two film frames in order to build a single composite TV video frame. By suitable synchronization circuits, which synchronize the movement of the drive capstan, that is, by applying suitable control signals to terminal 34 of the motor control unit 33 (FIG. 1), it is possible to so arrange the film transport speed, in which the composition of a complete TV image would take too long, that such particular speeds are prohibited. Such prohibited speeds, for example, are whole number multiples of normal film speed.

It is entirely possible to combine the described systems and methods, for example such that, if for some reason scanning of a film where exactly double standard speed is desired, the blank lines will receive signals corresponding to the next preceding lines although, then, the resolution of the image being shown is less. When such a line is to be reproduced, that is, when it is found that the addresses being read out contain no data information, the previously read data information is merely duplicated from the previously stored information which, as is customary, will be retained in the memory until replaced by new data. While this will fill the TV image screen without blank interlaces, the overall quality of reproduction, particularly regarding resolution, will not be as good as when the recording scanning rate, as the film is being moved, does not correspond to normal film speed, multiplied by a whole number.

Various changes and modifications may be made, and any one of the features described may be used with any of the others, within the scope of the inventive concept.

I claim:

1. Method of scanning motion picture film (1) to derive television signals, comprising the steps of
   continuously scanning a film frame, sequentially line by line, and deriving scanned signals;
   controlling the rate of scanning of a line in accordance with a repetition rate artifically distorted with respect to television scanning standards to compensate, selectively, for anamorphically distorted images on the film, or varying width of film frame bars;
   storing data represented by said scanned signals in a memory (16);
   reading-out the data stored in a memory in accordance with television scanning standards;
   and assigning the lines being scanned individual line addresses which are representative of the position of the scanned line in the film frame, said storing step including storing the signals in the memory, line by line, at said assigned addresses.

2. Method of scanning motion picture film (1) to derive television signals, in which the images on the film are anamorphically distorted, comprising the steps of
   continuously scanning a film frame, sequentially, line by line and deriving scanned signals, including the step of scanning the line at half standard television line frequency;
   storing data represented by scanned signals in a memory (16);
   reading-out the data stored in the memory in accordance with television scanning standards;
   assigning the lines being scanned individual line addresses which are representative of the position of the scanned line in the film frame, said storing step including storing the signals in the memory, line by line, at said assigned line addresses, in which the step of assigning the addresses to the signals to be stored comprises storing said signals at the addresses normally assigned to signals derived upon scanning of undistorted film.

3. Method of scanning motion picture film (1) to derive television signal comprising the steps of
   continuously scanning of film frame, sequentially, line by line and deriving scanned signals;
   storing data represented by scanned signals in a memory (16);
   reading-out the data stored in the memory in accordance with television scanning standards;
   assigning the lines being scanned individual line addresses which are representative of the position of the scanned line in the film frame, said storing step including storing the signals in the memory, line by line, at said assigned line addresses, and wherein the step of assigning addresses to the signals comprises adding a predetermined address number corresponding to half the number of lines of a standard television frame to alternate lines being scanned and to provide for storage of said alternate lines at memory locations remote from the adjacent line and interlace of alternate lines upon sequential read-out of the memory location.

4. Method of scanning motion picture film (1) to derive television signals, comprising the steps of
   continuously scanning a film frame, sequentially, line by line, and deriving scanned signals, said scanning step comprising scanning the respective film frame at the frequency which is, selectively, less or higher than standard television repetition frequency, to permit reproduction of slow motion, or speeded-up motion respectively;

storing data represented by said scanned signals in a memory (16);

reading-out the data stored in the memory in accordance with television scanning standards;

assigning the lines being scanned individual line addresses which are representative of the position of the scanned line in the film frame, said storing step including storing the signals in the memory, line by line, at said assigned line addresses, the step of assigning line addresses to the signals to be stored in the memory comprising assigning the signals of any one line being scanned that address in the memory which is next available at the beginning of scanning the respective line.

5. Method according to claim 1 or 2 or 2 or 4, wherein the step of assigning addresses to the signals to be stored comprises determining line addresses for the signals to be stored in the memory as a function of film position with respect to a scanning device.

6. Method according to claim 1 or 2 or 3 or 4, further comprising the step of sensing the position of a predetermined location regularly recurring with respect to each film frame on the film (1);

controlling a counter (25) to count when said position is sensed;

and the step of assigning addresses of the signals to be stored in the memory includes determining the line address as a function of the count state of the counter.

7. Method according to claim 6, wherein the predetermined location on the film, with respect to each film frame, is an edge of the motion picture film perforation.

8. Method according to claim 6, further comprising the step of engaging the film with a wheel or roller (4, 6) rotating conjointly with movement of the film;

and determining the predetermined location as a function of the angular position of the wheel or roller.

9. Method according to claim 6, wherein the predetermined location is determined by the position of motion film perforations;

and the step of sensing said position includes engaging the perforations with a sprocket (4), and deriving electrical signals as a function of the angular position of said sprocket.

10. Method according to claim 6, wherein the predetermined location regularly recurring with respect to each film frame recurs with respect to each film frame at a proportionality other than 1:1;

and said method comprises the further step of obtaining output pulses corresponding to each sensed predetermined location, and modifying the recurrence rate of the output pulses to reestablish a 1:1 relationship between modified output pulses and film frames, the counter being controlled in accordance with said modified pulses.

11. Method according to claim 1 or 2, wherein the step of scanning the film comprises scanning the lines of the film at a constant scanning duration.

12. Method according to claim 1 or 2, wherein the step of controlling the rate of scanning of a line comprises deriving a signal corresponding to the television synchronizing signal;

providing a controlled oscillator, and obtaining a controlled local signal;

phase-synchronizing the controlled local signal with the television synchronizing signal, and controlling the repetition rate of the synchronized local signal in accordance with control of the rate of scanning of the line.

13. Method according to claim 1 or 2 or 3 or 4, wherein the step of reading out the data in the memory in accordance with TV scanning standards comprises completing the read-out of signals defining the image of a first half-frame of a television representation after one film frame has been entirely scanned, to defer read-out of the data in the memory with respect to storage of data therein by at least approximately a half-frame of the television signal to be reproduced.

14. Method according to claim 1 or 2 or 3 or 4, wherein the step of scanning the film frame and reading out the data from the memory comprises moving the film at a rate providing for scanning of a film frame, line by line, and storage of signals in the memory to store an entire film frame in the memory, and the step of reading out the data from the memory comprises delaying the read-out of the signals being stored in the memory of said frame by the time duration of scanning of a half television frame to completely scan a film frame before the read-out of the first half-frame from the memory has terminated.

15. Method according to claim 4, wherein the frequency of scanning of the film is higher than the TV signal frame repetition frequency;

and wherein the relationship of the scanning frequency and the reproduction frequency is other than that of a whole number multiple relationship.

16. Method according to claim 4, including the step of controlling the speed of movement of the film past a film window, the scanning of the film frame, line by line, comprising the step of scanning the film as it appears in the window;

and the speed of movement of the film past the window is controlled to be other than the speed of the film upon exposure thereof to provide for, selectively, slow-motion or speeded-up motion effects, the scanning step of the film frame, line by line, being carried out a controlled rate corresponding to the scanning and synchronization standards of television reproduction, without regard to the relationship of movement of the film upon exposure and movement of the film past the window.

17. Method according to claim 16, wherein said relationship is other than a whole number multiple relationship.

18. Method according to claim 1 or 2, wherein the step of assigning an address to the signals to be stored comprises the step of assigning an initial address in the memory for the first line of any film frame to be scanned in dependence on the format of the film being scanned.

19. Method according to claim 1 or 2 or 3 or 4 wherein the step of generating the scanning control signal comprises deriving a signal corresponding to a television synchronizing signal;

providing a controlled oscillator, and obtaining a controlled local signal;

phase synchronizing the controlled local signal with the television synchronizing signal;

and controlling the rate of scanning of the line in accordance with the repetition rate of the phase synchronized local signal.

20. Method according to claim 1 or 2 or 3 or 4, wherein the step of scanning the film comprises scanning the lines of the film at a constant scanning duration.

21. System of scanning motion picture film (1) to derive television signals comprising a film window (5);

controlled drive means (6, 9, 33, 34) continuously moving the film past the film window;

scanning clock means (19) providing a scanning control clock pulse train;

scanning transducing means (12, 13, 19) connected to and controlled by said scanning clock means scanning sequential incremental areas, sequentially line by line, on the film as the film is being moved across the window, and furnishing a sequence of image signals representative of the image content of said incremental areas;

an addressable memory (16) connected to said scanning transducing means and storing the image signals at predetermined address locations;

read-out means (17) connected to said storage means and reading out the image signals stored in the memory, the read-out means being controlled to sequentially address said predetermined address locations in accordance with television scanning standards;

a memory address control means (31) controlling the storage of said image signals at said predetermined address locations;

and means (22, 23, 25, 32) to associate the line being scanned by said transducing means with the address of the memory in which the image signals will be stored comprising film frame transducing means (22) coupled to the film and providing frame signals representative of a regularly recurring predetermined location with respect to each film frame, and line position transducing means (23) providing line signals representative of the position of the film with respect to the regularly recurring predetermined location, said line signals and said frame signals being connected to and controlling said memory address control means (31) to furnish said predetermined address locations as determined by the position of the film with respect to said recurring location; and wherein the scanning clock means (19) comprises a controlled oscillator (40), at least one frequency divider (41, 42) at least one phase comparator (44, 47) and program control means (P; 43) controlling the division ratio of said at least one divider (41), the phase comparator having television synchronizing signals applied thereto;

the controlled oscillator, said at least one divider, and phase comparator being connected into a closed phase-locked loop and providing signals synchronized with said television synchronizing signals at a rate controlled by program control means (P; 43).

22. System according to claim 21, further including a line address counter (25) stepping under control of movement of said film past the film window.

23. System according to claim 22, wherein the line position and transducing means includes film movement sensing means (4-20, 22; 6-21, 23) coupled to the film and sensing when a predetermined recurring location on the film, characterizing the appearance of separate frames of the film is passing said window, said film movement sensing means being coupled to the counter (25) to thereby control the initial address of sequential lines of frames of the film, as the lines are being scanned, by characterizing the address for the first scanning line of any film frame.

24. System according to claim 21, wherein the controlled drive means comprises a film drive capstan (6);

a drive motor (9) and means controlling the speed of the motor including control means having applied thereto the vertical synchronizing frequency of the television signals; pulses derived from the film and characterizing the position of film frames representing film images on the film.

25. System according to claim 24, wherein the control means further includes phase comparison means comparing half vertical synchronizing signal frequencies with pulses characterizing the position of film frames and providing a phase difference of about one field.

* * * * *

UNITED STATES PATENT AND TRADEMARK OFFICE
CERTIFICATE OF CORRECTION

PATENT NO. : 4,288,818
DATED : September 8, 1981
INVENTOR(S) : Dieter POETSCH

It is certified that error appears in the above—identified patent and that said Letters Patent is hereby corrected as shown below:

Change claim 12 to read (bracketed portion deleted; underlined portion added):

Method according to claims 1 or 2, wherein the step of controlling the rate of scanning of a line comprises deriving a signal corresponding to [the] a television synchronizing signal;

providing a controlled oscillator, and obtaining a controlled local signal;

phase-synchronizing the controlled local signal with the television synchronizing signal[,];

and controlling the [repetition] rate of [the synchronized local signal] scanning of the line in accordance with [control of the] the repetition rate of [scanning of the line] the synchronized local signal.

Signed and Sealed this

Thirtieth Day of March 1982

[SEAL]

Attest:

Attesting Officer

GERALD J. MOSSINGHOFF

Commissioner of Patents and Trademarks